(12) United States Patent　　(10) Patent No.: US 10,123,061 B2
Asarikuniyil et al.　　(45) Date of Patent: Nov. 6, 2018

(54) CREATING A MANIFEST FILE AT A TIME OF CREATING RECORDED CONTENT

(71) Applicant: The DIRECTV Group, Inc., El Segundo, CA (US)

(72) Inventors: Binny Asarikuniyil, Cerritos, CA (US); Sudheer Bandela, Torrance, CA (US); Hai Nguyen, Torrance, CA (US); Heather Truong, Anaheim, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/363,416

(22) Filed: Nov. 29, 2016

(65) Prior Publication Data

US 2018/0152741 A1　　May 31, 2018

(51) Int. Cl.
　　*H04N 7/173*　　(2011.01)
　　*H04N 21/235*　　(2011.01)
　　*H04L 29/06*　　(2006.01)
　　*H04N 21/231*　　(2011.01)
　　*H04N 21/2747*　　(2011.01)
　　*H04N 21/239*　　(2011.01)

(52) U.S. Cl.
　　CPC ..... *H04N 21/2353* (2013.01); *H04L 65/4084* (2013.01); *H04N 21/231* (2013.01); *H04N 21/2393* (2013.01); *H04N 21/2747* (2013.01)

(58) Field of Classification Search
None
See application file for complete search history.

(56) References Cited

U.S. PATENT DOCUMENTS

| | | | |
|---|---|---|---|
| 8,561,102 B1 | 10/2013 | Mack et al. | |
| 9,338,209 B1 | 5/2016 | Begen et al. | |
| 9,363,566 B2 | 6/2016 | Makhijani et al. | |
| 9,392,307 B2 | 7/2016 | Cranman et al. | |
| 9,444,861 B2 | 9/2016 | Freeman, II et al. | |
| 9,462,307 B2 | 10/2016 | Casey et al. | |
| 9,602,846 B1* | 3/2017 | Martel | H04N 21/2187 |
| 2003/0093790 A1* | 5/2003 | Logan | G06F 17/30265 |
| | | | 725/38 |
| 2003/0233663 A1* | 12/2003 | Rao | H04N 5/76 |
| | | | 725/131 |
| 2004/0237104 A1* | 11/2004 | Cooper | H04N 21/4126 |
| | | | 725/38 |
| 2007/0186266 A1 | 8/2007 | Watson et al. | |
| 2008/0275974 A1 | 11/2008 | Rackiewicz | |
| 2009/0158336 A1 | 6/2009 | Newdeck et al. | |
| 2011/0083073 A1* | 4/2011 | Atkins | H04N 21/4147 |
| | | | 715/704 |
| 2011/0302320 A1* | 12/2011 | Dunstan | G06F 17/30017 |
| | | | 709/235 |

(Continued)

*Primary Examiner* — William J Kim
(74) *Attorney, Agent, or Firm* — Hartman & Citrin LLC

(57) ABSTRACT

Concepts and technologies are disclosed herein for creating a manifest file at a time of creating recorded content. A video device can request media content from a content source and receive the media content requested. The media content can be received with metadata from the content source. The video device can record the media content to generate recorded content and create, during the recording of the media content, a manifest file that includes at least a portion of the metadata that is received from the content source. The video device can store the recorded content and the manifest file.

20 Claims, 6 Drawing Sheets

(56) References Cited

U.S. PATENT DOCUMENTS

| | | |
|---|---|---|
| 2012/0047542 A1* | 2/2012 | Lewis .............. H04N 21/44016 |
| | | 725/97 |
| 2014/0098850 A1 | 4/2014 | Wolfram et al. |
| 2014/0189761 A1* | 7/2014 | Sood ................ H04N 21/26283 |
| | | 725/92 |
| 2014/0237520 A1* | 8/2014 | Rothschild ........... H04N 21/236 |
| | | 725/88 |
| 2014/0282750 A1* | 9/2014 | Civiletto ............ H04N 21/2747 |
| | | 725/74 |
| 2014/0282765 A1* | 9/2014 | Casey ................ H04N 21/2225 |
| | | 725/93 |
| 2014/0304373 A1 | 10/2014 | Tarbox et al. |
| 2014/0355625 A1* | 12/2014 | Chen .................... H04L 65/605 |
| | | 370/468 |
| 2015/0261600 A1* | 9/2015 | Iturralde ................. G06F 11/08 |
| | | 714/747 |
| 2015/0271541 A1* | 9/2015 | Gonder ................ H04N 21/278 |
| | | 725/134 |
| 2016/0249092 A1 | 8/2016 | Hasek, IV |
| 2016/0360243 A1* | 12/2016 | Arbuckle ......... H04N 21/23116 |

* cited by examiner

CREATING A MANIFEST FILE AT A TIME OF CREATING RECORDED CONTENT

BACKGROUND

Over the past several years, the delivery of media content such as movies, television shows, or the like, has changed drastically. Whereas in the past media content often was delivered via broadcast, video rentals, and the like, some modern consumers of media content may obtain the media content that is being consumed using various types of devices that can be configured to obtain the data via one or more data sessions.

Additionally, the prevalence of high speed Internet and other changes has enabled users to record content for consumption at various times and/or using various devices instead of "tuning in" to a broadcast stream. Thus, some modern consumers of media content may configure a video device (e.g., a digital video recorder ("DVR") device) to obtain and record media content for consumption at some time in the future. Also, instead of watching a video or other media content on a television, some modern consumers may instead elect to stream the content to a user device such as a tablet, cellular telephone or smartphone, or the like.

These changes continue to evolve the way media content is consumed today. When a consumer wishes to view media content, the device from which the content is streamed may create a streaming manifest or manifest file. The manifest file can include information that may be needed or may be used to stream the content to a device used to view the media content. In particular, the manifest file can be provided to a recipient device being used to view the content and the recipient device may set up a data stream and/or data session using the manifest file. The recipient may use other information included in the manifest file to view the content, in some embodiments.

SUMMARY

The present disclosure is directed to creating a manifest file at a time of creating recorded content. A video device can execute a video application. The video application can be used to request media content from a source such as a server computer. The video application also can be used to record the media content as recorded content. In some embodiments, the video device can generate and/or send a media content request to the server computer or other source of the media content. In response to the request for the media content, the media content can be received at the video device. The media content can be received by the video device as a file, as part of a stream, or in another file format (or combination of file formats). The video device can be configured to record the media content as the recorded content. During the recording of the media content as the recorded content, the video device can capture data needed to create a manifest file and create the manifest file at recording time. This data may be included in metadata that is received by the video device with the media content, in some embodiments. Thus, when recording of the media content as the recorded content is completed, creation of the manifest file can also be completed. Thus, the video device can be configured to store the recorded content and the manifest file at substantially the same time.

The video device can receive a request for the recorded content such as a recorded content request from a requestor. The recorded content request can specify content that a user or other entity wishes to view or otherwise obtain from the video device. The vide device can use information included in the recorded content request to identify the recorded content associated with the recorded content request and to identify a manifest file associated with the recorded content requested by way of the recorded content request. The video device can provide the manifest file to the requestor and provide the recorded content. It can be appreciated that the manifest file can be used by the recipient device to set up the recipient device (e.g., a user device) for receiving and/or interpreting the recorded content. As such, various embodiments of the concepts and technologies disclosed herein can provide the recorded content without any delay that may otherwise result from having to create the manifest file.

A playback application can be executed by a recipient device such as the user device. This playback application can be used to generate the recorded content request and/or to present a movie, show, or other video represented by the recorded content to a user or other entity. According to various embodiments, the playback application can use the manifest file to set up or plan a video stream via which the video or movie can be streamed to the user device. The manifest file also can be used to present the movie, show, or other video associated with the recorded content. For example, the playback application can use the manifest file to identify advertising breaks in the video; to fill those advertising breaks with advertisements; to identify segments in the video; to identify, configure, and/or decode audio associated with the video and/or segments of the video; to determine frame rates, resolutions, and/or to decode video; combinations thereof; or the like. Thus, the recorded content can be presented by the user device using the manifest file where the manifest file is created during generation of the recorded content.

According to one aspect of the concepts and technologies disclosed herein, a video device is disclosed. The video device can include a processor and a memory. The memory can store computer-executable instructions that, when executed by the processor, cause the processor to perform operations. The operations can include requesting media content from a content source and receiving the media content requested. The media content can be received with metadata from the content source. The operations also can include recording the media content to generate recorded content, creating, during the recording of the media content, a manifest file that includes a portion of the metadata that is received from the content source, and storing the recorded content and the manifest file.

In some embodiments, the video device can request the media content in response to detecting a command to record the media content. In some embodiments, the command to record the media content can be received via a user interface that can be presented by the video device. In some embodiments, the metadata can include data that can define a segment associated with the media content, a frame rate of video associated with the media content, and information that can define an advertisement break associated with the video. In some embodiments, the computer-executable instructions, when executed by the processor, can cause the processor to perform operations that further can include receiving a request for the recorded content from a user device in communication with the video device; identifying the recorded content and the manifest file that was created during recording of the media content; and providing, to the user device, the recorded content and the manifest file that was created during recording of the media content. In some embodiments, providing the recorded content and the manifest file can include providing the manifest file to the user device, where the user device can use the manifest file to set up a video stream via which the recorded content is to be received; and streaming the recorded content to the user device using the video stream.

According to another aspect of the concepts and technologies disclosed herein, a computer storage medium is disclosed. The computer storage medium can store computer-executable instructions that, when executed by a processor, cause the processor to perform operations. The operations can include requesting media content from a content source and receiving the media content requested. The media content can be received with metadata from the content source. The operations also can include recording the media content to generate recorded content, creating, during the recording of the media content, a manifest file that includes a portion of the metadata that is received from the content source, and storing the recorded content and the manifest file.

In some embodiments, the video device can request the media content in response to detecting a command to record the media content. In some embodiments, the command to record the media content can be received via a user interface that can be presented by the video device. In some embodiments, the metadata can include data that can define a segment associated with the media content, a frame rate of video associated with the media content, and information that can define an advertisement break associated with the video. In some embodiments, the computer-executable instructions, when executed by the processor, can cause the processor to perform operations that further can include receiving a request for the recorded content from a user device in communication with the video device; identifying the recorded content and the manifest file that was created during recording of the media content; and providing, to the user device, the recorded content and the manifest file that was created during recording of the media content. In some embodiments, providing the recorded content and the manifest file can include providing the manifest file to the user device, where the user device can use the manifest file to set up a video stream via which the recorded content is to be received; and streaming the recorded content to the user device using the video stream.

According to yet another aspect, a method is disclosed. The method can include requesting, by a video device that can include a processor, media content from a content source and receiving, by the video device, the media content requested. The media content can be received with metadata from the content source. The method also can include recording, by the video device, the media content to generate recorded content; creating, by the video device and during the recording of the media content, a manifest file that includes a portion of the metadata that is received from the content source; and storing, by the video device, the recorded content and the manifest file.

In some embodiments, the video device can request the media content in response to detecting a command to record the media content. In some embodiments, the command to record the media content can be received via a user interface that can be presented by the video device. In some embodiments, the metadata can include data that can define a segment associated with the media content. In some embodiments, the metadata can include data that can define a segment associated with the media content, a frame rate of video associated with the media content, and information that can define an advertisement break associated with the video. In some embodiments, the method further can include receiving, by the video device, a request for the recorded content from a user device in communication with the video device; identifying, by the video device, the recorded content and the manifest file that was created during recording of the media content; and providing, by the video device and to the user device, the recorded content and the manifest file that was created during recording of the media content.

In some embodiments, providing the recorded content and the manifest file can include providing the manifest file to the user device. The user device can use the manifest file to set up a video stream via which the recorded content is to be received. Providing the recorded content and the manifest file further can include streaming the recorded content to the user device using the video stream. In some embodiments, the manifest file can be stored as a hypertext transfer protocol live streaming file.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
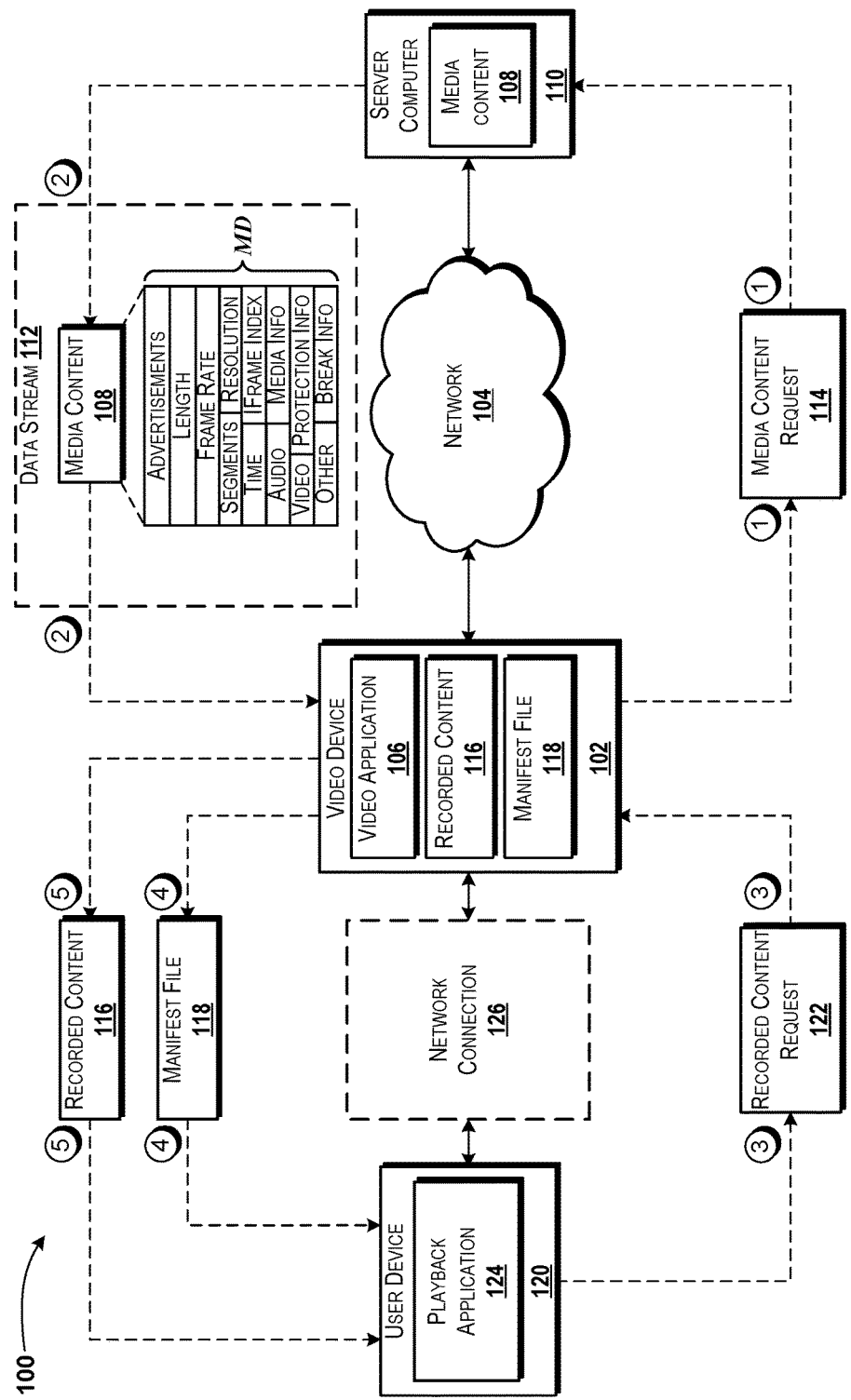
FIG. 1 is a system diagram illustrating an illustrative operating environment for various embodiments of the concepts and technologies described herein.

The following detailed description is directed to creating a manifest file at a time of creating recorded content. A video device can execute a video application. The video application can be used to request media content such as the media content from a source such as a server computer and to record the media content as recorded content. In some embodiments, the video device can generate and/or send a media content request to the server computer or other source of the media content. In response to the request for the media content, the media content can be received at the video device. The media content can be received by the video device as a file, as part of a stream, or in another file format (or combination of file formats). The video device can be configured to record the media content as the recorded content. During the recording of the media content as the recorded content, the video device can capture data needed to create a manifest file and create the manifest file at recording time. Thus, when recording of the media content as the recorded content is completed, creation of the manifest file can also be completed. Thus, the video device can be configured to store the recorded content and the manifest file at substantially the same time.

The video device can receive a request for the recorded content such as a recorded content request from a requestor. The recorded content request can specify content that a user or other entity wishes to view or otherwise obtain from the video device. The vide device can use information included in the recorded content request to identify the recorded content associated with the recorded content request and to identify a manifest file associated with the recorded content requested by way of the recorded content request. The video device can provide the manifest file to the requestor and follow up with the recorded content. It can be appreciated that the manifest file can be used by the recipient device to set up the recipient device (e.g., a user device) for receiving and/or interpreting the recorded content. As such, various embodiments of the concepts and technologies disclosed herein can provide the recorded content without any delay that may otherwise result from having to create the manifest file.

A playback application can be executed by a recipient device such as the user device. This playback application can be used to generate the recorded content request and/or to present a movie, show, or other video represented by the recorded content to a user or other entity. According to various embodiments, the playback application can use the manifest file to set up a video stream via which the video or movie can be streamed to the user device. The manifest file also can be used to present the movie, show, or other video associated with the recorded content. For example, the playback application can use the manifest file to identify advertising breaks in the video; to fill those advertising breaks with advertisements; to identify segments in the video; to identify, configure, and/or decode audio associated with the video and/or segments of the video; to determine frame rates, resolutions, and/or to decode video; combinations thereof; or the like. Thus, the recorded content can be presented by the user device using the manifest file where the manifest file is created during generation of the recorded content.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating a manifest file at a time of creating recorded content will be described, according to an illustrative embodiment. The operating environment 100 shown in FIG. 1 includes a video device 102. In various embodiments, the video device 102 can be configured to operate in communication with and/or as part of a communications network ("network") 104, though this is not necessarily the case.

According to various embodiments, the functionality of the video device 102 may be provided by one or more set-top boxes, customer premise equipment ("CPE") devices, digital video recorder ("DVR") devices, server computers, desktop computers, mobile telephones, laptop computers, tablet computing devices, other computing systems, and the like. It should be understood that the functionality of the video device 102 can be provided by a single device, by two similar devices, and/or by two or more dissimilar devices. For purposes of describing the concepts and technologies disclosed herein, the video device 102 is described herein as a CPE device, a DVR device, and/or a combination thereof. It should be understood that this embodiment is illustrative, and should not be construed as being limiting in any way.

The video device 102 can execute an operating system (not shown in FIG. 1) and one or more application programs such as, for example, a video application 106. The operating system can include a computer program that can be configured to control the operation of the video device 102. The video application 106 can include an executable program that can be configured to execute on top of the operating system to provide various functions as illustrated and described herein for creating a manifest file at a time of creating recorded content.

In particular, the video application 106 can be configured to request and/or obtain media content 108 from a content source such as a content server or other type of server computer (hereinafter referred to as a "server computer") 110. According to various embodiments, the media content 108 can include data associated with video content. Thus, it can be appreciated that the media content 108 can include images, audio, and various types of data that can represent how the images and audio collectively represent a video. Thus, for example, the media content 108 can include one or more video file and one or more audio file, in some embodiments. As shown in FIG. 1, the media content 108 can include advertisements, and the video and/or audio can be divided into one or more segments, if desired. In some other embodiments, the media content 108 can include video and audio and various types of metadata or other data (labeled "MD" in FIG. 1). The metadata MD can define and/or identify one or more segments and/or segment information; one or more advertisements and/or advertisement information; one or more frame rate(s); one or more resolution(s); one or more lengths of segments, advertisements, breaks, audio, and/or video; time information; iframe index information; media information; protection information; break information; and/or other information.

According to various embodiments, the information that defines the segments can include information that defines segment durations and/or a segment index. Thus, the information that defines the segments can identify the chunks of the media content 108. According to some embodiments, the size of the segments is configurable. In some embodiments, a smallest size of the segments can be equivalent to the group of pictures ("GOP") structure of the file in a closed GOP formatted file. The segments information also can provide a byte offset and/or range in the content file to retrieve a segment of a configured size. It should be understood that this example is illustrative, and therefore should not be construed as being limiting in any way.

The advertisements can include audio, video, and/or other information relating to one or more advertisements. The frame rate information can identify one or more frame rates for the video and/or segments of video. The length information can define or identify one or more lengths of videos, segments, breaks, and/or advertisements. The time information can define times at which breaks begin, end, and/or the durations of the breaks. The audio information can define various aspects of audio such as bit rates, sampling rates, durations, offsets, and the like. The media information can describe the content and/or details thereof. Thus, the media information can define one or more codecs and/or codec information, bit rates, resolution information, media titles, or the like.

The video information can define one or more videos, images, and/or sequences of images. The protection information can provide details of any content protection applied to the media content 108, if any such protection is used. The break information can define details of content discontinuity within the media content 108 such as a beginning and/or end of an advertising break. It should be understood that this example is illustrative, and therefore should not be construed as being limiting in any way.

According to various embodiments, the media content 108 can be provided to the video device 102 as or via a video stream or other data stream such as the data stream 112 shown in FIG. 1, though this is not necessarily the case. In some other embodiments, the media content 108 can be provided to the video device 102 as a file that is downloaded by the video device 102. According to various embodiments of the concepts and technologies disclosed herein, the media content 108 can be streamed to the video device 102 in response to the video device 102 requesting the media content 108, for example via a media content request 114. It can be appreciated that the media content request 114 can be generated by the video device 102 in response to a request for the media content 108 at the video device 102. For example, a user of the video device 102 may access a menu or ordering interface associated with the video device 102 (e.g., an ordering interface that can be presented by the video application 106) and request a particular instance of content such as a particular movie, show, or the like. This request can be used to generate the media content request 114, which can be transmitted to the server computer 110 by the video device 102. Because the request for media content 108 can be made in additional and/or alternative manners (instead of or in addition to the media content request 114), it should be understood that this example is illustrative, and therefore should not be construed as being limiting in any way.

As noted above, the media content 108 can be streamed to, transmitted to, downloaded by, and/or otherwise transferred or transmitted to the video device 102. According to various embodiments of the concepts and technologies disclosed herein, the video device 102 can be configured; by default, by request, by settings, by configurations, or in other manners; to record the media content 108 instead of, or in addition to, presenting the media content 108 for immediate consumption. Thus, for example, the video device 102 can be configured to record the media content 108 for later consumption by a user or device and therefore can capture and/or record the media content 108 as recorded content 116. The recorded content 116 can include the video associated with the media content 108 as illustrated and described herein.

In various video recording devices, recorded content similar to the recorded content 116 can be captured by devices and later streamed to a requestor or other device. With those devices, however, prior to streaming the content to a requestor, the devices must obtain or generate a streaming manifest file ("manifest file") such as the manifest file 118 shown in FIG. 1. The process of creating a manifest file 118 can take, on average, thirty to forty-five seconds. During this time, the streaming of the recorded content 116 can be delayed. Embodiments of the concepts and technologies disclosed herein create the manifest file 118 during recording of the media content 108 as the recorded content 116 and store the manifest file 118 for use if and when the recorded content 116 is streamed to another device. Thus, embodiments of the concepts and technologies disclosed herein provide almost instantaneous streaming of the recorded content 116 to a user device 120 upon request for the recorded content 116 by eliminating delays typically associated with creation of the manifest file 118. It should be understood that this example is illustrative, and therefore should not be construed as being limiting in any way.

In some embodiments of the concepts and technologies disclosed herein, the manifest file 118 illustrated and described herein can be formatted in an HTTP live streaming ("HLS") format. In this contemplated example, an example manifest may be formatted as follows:
EXT-X-STREAM-INF:AVERAGE-BAND-WIDTH=152688,BANDWIDTH=173539,
CODECS="mp4a.40.5,
avc1.4d401e",RESOLUTION=320×180
http://10.2.178.77:8080/exp/nflvod/trial/vod/1.ts.index.m3u8
EXT-X-STREAM-INF:AVERAGE-BAND-WIDTH=316409,BANDWIDTH=347515,
CODECS="mp4a.40.5,
avc1.4d401e",RESOLUTION=480×270
http://10.2.178.77:8080/exp/nflvod/trial/vod/2.ts.index.m3u8
EXT-X-STREAM-INF:AVERAGE-BAND-WIDTH=593166,BANDWIDTH=669879,
CODECS="mp4a.40.5,
avc1.4d401e",RESOLUTION=480×270
http://10.2.178.77:8080/exp/nflvod/trial/vod/3.ts.index.m3u8
It should be understood that this example is illustrative, and therefore should not be construed as being limiting in any way.

In another example, an example manifest may include byte ranges and may be formatted as follows:
EXT-X-TARGETDURATION:8
EXT-X-MEDIA-SEQUENCE:0
EXT-X-INDEPENDENT-SEGMENTS
EXTINF:8.25368,
EXT-X-BYTERANGE:149648@0
http://10.2.178.77:8080/exp/nflvod/trial/vod/1.ts.ts
EXTINF:8.04758,
EXT-X-BYTERANGE:150588@149648
http://10.2.178.77:8080/exp/nflvod/trial/vod/1.ts.ts
EXTINF:8.12012,
EXT-X-BYTERANGE:152656@300236
http://10.2.178.77:8080/exp/nflvod/trial/vod/1.ts.ts
It should be understood that this example is illustrative, and therefore should not be construed as being limiting in any way.

In another example, an example manifest may include iframe byte ranges and may be formatted as follows:
EXT-X-TARGETDURATION:8
EXT-X-MEDIA-SEQUENCE:0
EXT-X-I-FRAMES-ONLY
EXTINF:2.00200,
EXT-X-BYTERANGE:11092@19176
http://10.2.178.77:8080/exp/nflvod/trial/vod/1.ts.ts

EXTINF:2.00200,
EXT-X-BYTERANGE:10152@56964
http://10.2.178.77:8080/exp/nflvod/trial/vod/1.ts.ts
EXTINF:2.00200,
EXT-X-BYTERANGE:9024@88924
http://10.2.178.77:8080/exp/nflvod/trial/vod/1.ts.ts
It should be understood that this example is illustrative, and therefore should not be construed as being limiting in any way.

In particular, the video device 102 can be configured to receive a request (e.g., the recorded content request 122) from a user device 120. The recorded content request 122 can request streaming of the recorded content 116 from the video device 102 to the user device 120. According to various embodiments, the recorded content request 122 can be generated by a playback application 124 that can be executed by the user device 120. The playback application 124 can, for example, present a user interface with selectable user interface controls for selecting media that a user wants to view at the user device 120, where the media presented in the user interface can correspond to the recorded content 116 and/or other content that may have previously been recorded. It should be understood that this example is illustrative, and therefore should not be construed as being limiting in any way.

The recorded content request 122 can be transmitted from the user device 120 to the video device 102 via one or more network connections 126. According to various embodiments, the network connection(s) 126 can be provided by the network 104 and/or other networks such as local area networks, wide area networks, the Internet, and/or other network connections. In response to receiving the recorded content request 122, the video device 102 can identify recorded content 116 that is requested by way of the recorded content request 122. The video device 102 also can identify a manifest file 118 associated with the recorded content 116. It therefore can be appreciated that one or more instances of recorded content 116 and/or one or more manifest files 118 can be stored with information that can be used to associate the recorded content 116 and the manifest files 118. It should be understood that this example is illustrative, and therefore should not be construed as being limiting in any way.

In response to the recorded content request 122, the video device 102 can transmit the manifest file 118 to the user device 120. The manifest file 118 can indicate, to the user device 120 and as is known, various aspects of the recorded content 116 such as time information, length information, frame rates for video, video resolution, sampling rates for audio, information that identifies segments within the video, other information, combinations thereof, or the like. Thus, the manifest file 118 can be used to inform the user device 120 how to interpret the recorded content 116 when streamed and/or transmitted to the user device 120 by the video device 102. After providing the manifest file 118 (or at substantially the same time), the video device 102 can transmit the recorded content 116 to the user device 120. It can be appreciated that the recorded content 116 can be streamed, in various embodiments, from the video device 102 to the user device 120 via the one or more network connection(s) 126. It should be understood that this example is illustrative, and therefore should not be construed as being limiting in any way.

In practice, the video device 102 can request media content such as the media content 108 from a source such as the server computer 110. In some embodiments, the video device 102 can generate and/or send a media content request 114 to the server computer 110 or other source of the media content 108. In response to the request for the media content 108, the media content 108 can be received at the video device 102 (either as a file or as part of a stream). The video device 102 can be configured to record the media content 108 as the recorded content 116. During the recording of the media content 108 as the recorded content 116, the video device 102 can capture data needed to create a manifest file 118 and create the manifest file 118 at recording time. The data needed to create the manifest file 118 can be included, in some embodiments, as metadata MD that can be included with the media content 108 and/or otherwise included in a stream or data associated with the media content 108. Thus, when recording of the media content 108 as the recorded content 116 is completed, creation of the manifest file 118 can also be completed, in some embodiments. Thus, the video device 102 can be configured to store the recorded content 116 and the manifest file 118 at substantially the same time. It should be understood that this example is illustrative, and therefore should not be construed as being limiting in any way.

The video device 102 can receive a request for the recorded content 116 such as the recorded content request 122 from a requestor or requestor device. The recorded content request 122 can specify content that a user or other entity wishes to view or otherwise obtain from the video device 102. The video device 102 can use information included in the recorded content request 122 to identify the recorded content 116 associated with the recorded content request 122 and to identify a manifest file 118 associated with the recorded content 116 requested by way of the recorded content request 122. The video device 102 can provide the manifest file 118 to the requestor and follow up with the recorded content 116. It can be appreciated that the manifest file 118 can be used by the recipient device to set up the device for receiving and/or interpreting the recorded content 116. As such, various embodiments of the concepts and technologies disclosed herein can provide the recorded content 116 to a recipient or recipient device without any delay that otherwise may result from having to create the manifest file 118. It should be understood that this example is illustrative, and therefore should not be construed as being limiting in any way.

The playback application 124 executed by the user device 120 also can be configured to present a movie, show, or other video represented by the recorded content 116 to a user or other entity. According to various embodiments, the playback application 124 can use the manifest file 118 to set up a video stream with the video device 102. The video stream can be used to stream the video from the video device 102 to the user device 120 and the user device 120 can present the movie, show, or other video associated with the recorded content 116. For example, the playback application 124 can use the manifest file 118 to identify advertising breaks in the video; to fill those advertising breaks with advertisements; to identify segments in the video; to identify, configure, and/or decode audio associated with the video and/or segments of the video; to determine frame rates, resolutions, and/or to decode video; combinations thereof; or the like. Thus, the recorded content 116 can be presented by the user device 120 using the manifest file 118 where the manifest file 118 is created during generation of the recorded content 116.

FIG. 1 illustrates one video device 102, one network 104, one server computer 110, one data stream 112, one user device 120, and one network connection 126. It should be understood, however, that various implementations of the operating environment 100 can include zero, one, or more than one video device 102; zero, one, or more than one network 104; zero, one, or more than one server computer 110; zero, one, or more than one data stream 112; zero, one, or more than one user device 120; and/or zero, one, or more than one network connection 126. As such, the illustrated embodiment should be understood as being illustrative, and should not be construed as being limiting in any way. It should be understood that the numbers labeling the communications in FIG. 1 are illustrative of one contemplated embodiment and that other orders of the described operations and communications are possible and are contemplated. Thus, the illustrated embodiment is illustrative and should not be construed as being limiting in any way.

Figure 2:
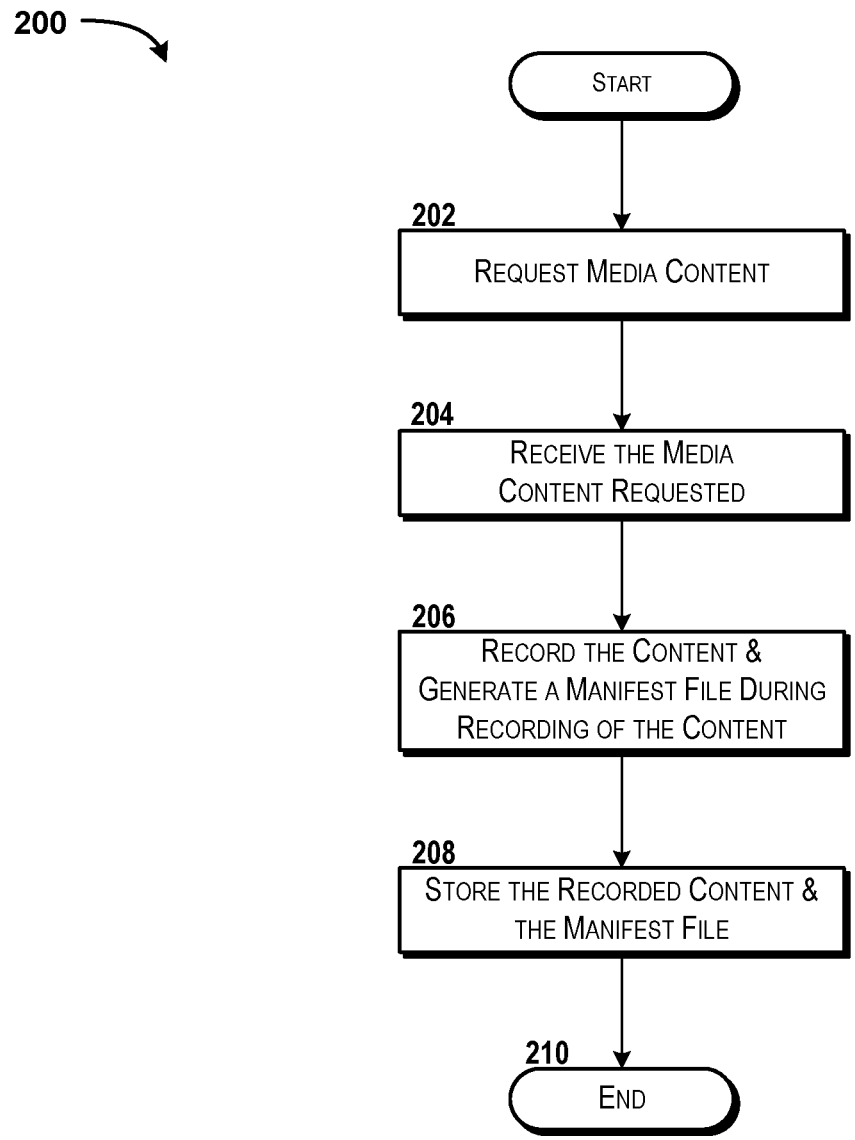
FIG. 2 is a flow diagram showing aspects of a method for creating a manifest file at a time of creating recorded content, according to an illustrative embodiment of the concepts and technologies described herein.

Turning now to FIG. 2, aspects of a method 200 for creating a manifest file 118 at the time of creating recorded content 116 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the video device 102, the server computer 110, the user device 120, or other device, to perform one or more operations and/or causing the processor to direct other components of the computing system or device to perform one or more of the operations.

For purposes of illustrating and describing the concepts of the present disclosure, the methods disclosed herein are described as being performed by the video device 102 via execution of one or more software modules such as, for example, the video application 106. It should be understood that additional and/or alternative devices and/or network nodes can provide the functionality described herein via execution of one or more modules, applications, and/or other software including, but not limited to, the video application 106. Thus, the illustrated embodiments are illustrative, and should not be viewed as being limiting in any way.

The method 200 begins at operation 202. At operation 202, the video device 102 can request media content such as the media content 108. According to various embodiments of the concepts and technologies disclosed herein, the video device 102 can request the media content 108 from a content server or other source of media content such as the server computer 110 illustrated and described herein. According to various embodiments of the concepts and technologies disclosed herein, the video device 102 can create a request such as the media content request 114 in response to receiving a request or detecting an interaction that can be interpreted by the video application 106 and/or the video device 102 as a request for the media content 108. As explained above, for example, a user or other entity may interact with a user interface that can be presented by the video device 102 such as, for example, a programming guide or the like. The user or other entity can select a particular movie, show, or other content for recording by the video device 102. In some embodiments, the video device 102 can request the media content 108 from the data source in response to this request from the user or other entity, though this is not necessarily the case.

In some embodiments, in response to detecting selection of the movie, show, or other content, the video device 102 can generate a request for media content 108 that corresponds to the requested content and send the request (e.g., the media content request 114) to a source of the content such as the server computer 110 illustrated and described herein. In response to receiving the media content request 114, the server computer 110 can be configured to stream, transmit, or otherwise provide the media content 108 to the video device 102. According to various embodiments of the concepts and technologies disclosed herein, the media content 108 can be provided with metadata MD that can describe the media content 108 and/or one or more aspects of the data that corresponds to the media content 108. Because the media content 108 can be requested in additional and/or alternative manners, and because the media content request 114 illustrated and described herein can be generated in response to additional and/or alternative actions, it should be understood that this example is illustrative, and therefore should not be construed as being limiting in any way.

From operation 202, the method 200 can proceed to operation 204. At operation 204, the video device 102 can receive the media content 108 requested in operation 202. In accordance with the description herein, it can be appreciated that the video device 102 can receive the media content 108 as part of a content or data stream such as the data stream 112, though this is not necessarily the case. As explained herein, the media content 108 can also be provided to the video device 102 as a file or other form of data. In some embodiments, as illustrated and described in FIG. 1, the media content 108 can be provided with one or more instances of metadata MD, which can include various types of information about the media content 108.

Regardless of how the media content 108 is provided to the video device 102, the video device 102 can receive the media content 108 in operation 204. As shown in FIG. 1, the media content 108 (or data representing the media content 108) received in operation 204 can include data (e.g., the metadata MD and/or other data) that can represent a length of a show, advertisement, movie, episode, or other video that corresponds to the media content 108; one or more times associated with the show, advertisement, movie, episode, or other video that corresponds to the media content 108; one or more frame rates associated with the show, advertisement, movie, episode, or other video that corresponds to the media content 108; one or more segments associated with the show, advertisement, movie, episode, or other video that corresponds to the media content 108; one or more audio files associated with the show, advertisement, movie, episode, or other video that corresponds to the media content 108 and/or associated audio file information such as bit rates, sampling rates, or the like; one or more images or video sequences associated with the show, advertisement, movie, episode, or other video that corresponds to the media content 108; one or more advertisements associated with the show, advertisement, movie, episode, or other video that corresponds to the media content 108; other data associated with the show, advertisement, movie, episode, or other video that corresponds to the media content 108; combinations thereof; or the like.

Thus, it can be appreciated that the media content 108 provided in operation 204 can include data that defines and/or represents various aspects of the media content 108 that may be needed to create the manifest file 118 illustrated and described herein. It should be understood, however, that the data used to create the manifest file 118 can be provided as part of the media content 108, with the media content 108, by the server computer 110, by other devices (not shown in FIG. 1), and the like, and therefore may not be provided separately in some embodiments. As such, the illustrated embodiment of FIG. 1 is illustrative and should not be construed as being limiting in any way.

From operation 204, the method 200 can proceed to operation 206. At operation 206, the video device 102 can record the media content 108 to generate the recorded content 116 illustrated and described herein. During recording of the media content 108 to create the recorded content 116, the video device 102 can create the manifest file 118 based on the media content 108 and/or based on information that can be provided with the media content 108 such as, for example, the metadata MD. According to various embodiments of the concepts and technologies disclosed herein, the video device 102 can be configured to determine various aspects of the media content 108 that are used to create the manifest file 118 during recording of the media content 108 without receiving information that indicates these aspects separately and/or as part of the media content 108. Thus, for example, the video device 102 can determine the length of the media content 108 during recording of the media content 108. Similarly, the video device 102 can determine the frame rate, resolution, and/or the like of the media content 108 during recording of the media content 108. Similarly, the video device 102 can identify one or more segments and/or times associated with the media content 108 during recording of the media content 108. Still further, the video device 102 can identify one or more advertisements and/or advertisement breaks of the media content 108 during recording of the media content 108. Thus, it can be appreciated that the video device 102 can identify any aspects of the media content 108 needed for the manifest file 118 during recording of the media content 108 as the recorded content 116.

From operation 206, the method 200 can proceed to operation 208. At operation 208, the video device 102 can store the recorded content 116 and the manifest file 118 created in operation 206. According to various embodiments, the recorded content 116 and the manifest file 118 can be stored in a memory, mass storage device, and/or other data storage device associated with the video device 102. In some other embodiments, the recorded content 116 and the manifest file 118 can be stored in a memory, mass storage device, and/or other data storage device that can be remote from the video device 102. As explained above, the recorded content 116 and the manifest file 118 generated in operation 206 can be stored with data that associates (or can be used to associate) the recorded content 116 and the manifest file 118. At any rate, multiple instances of recorded content 116 and/or multiple manifest files 118 can be stored simultaneously by the video device 102.

From operation 208, the method 200 can proceed to operation 210. The method 200 can end at operation 210.

Figure 3:
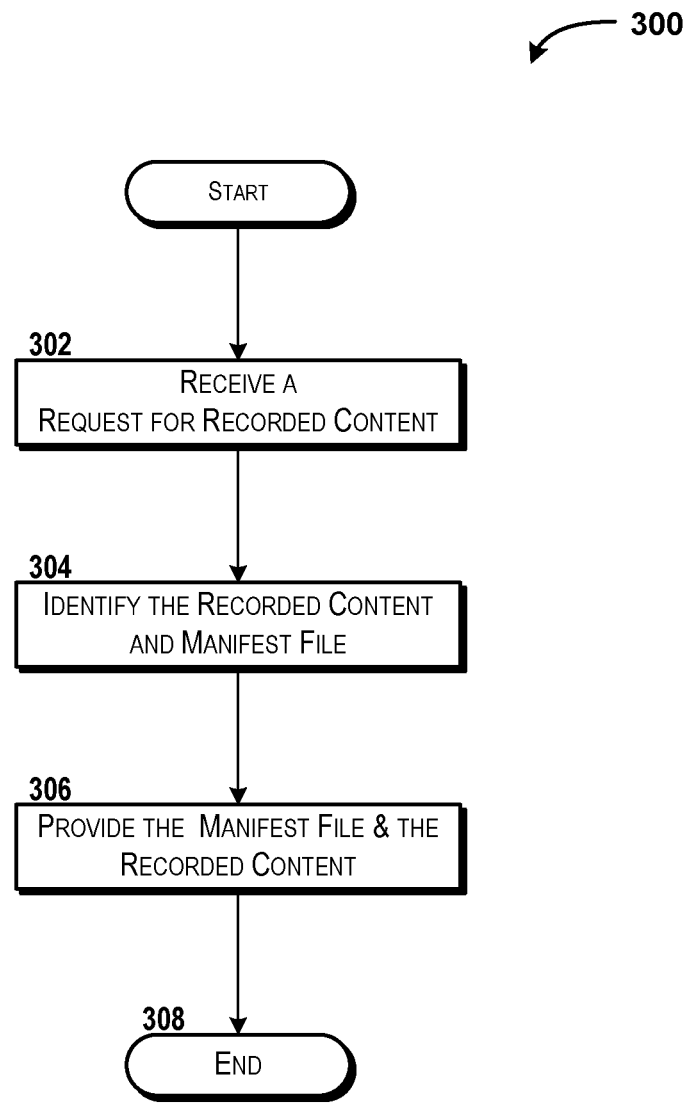
FIG. 3 is a flow diagram showing aspects of a method for providing, to a recipient, a manifest file that was created at the time of creating recorded content, according to an illustrative embodiment of the concepts and technologies described herein.

Turning now to FIG. 3, aspects of a method 300 for providing, to a recipient, a manifest file 118 that was created at the time of creating recorded content 116 will be described in detail, according to an illustrative embodiment. The method 300 begins at operation 302. At operation 302, the video device 102 can receive a request for recorded content 116 such as, for example, the recorded content request 122 illustrated and described herein. According to various embodiments of the concepts and technologies disclosed herein, the video device 102 can receive the recorded content request 122 from a user device 120 or other requestor. According to various embodiments of the concepts and technologies disclosed herein, the user device 120 can create the recorded content request 122 in response to receiving a request or detecting an interaction that can be interpreted by the playback application 124 and/or other application executed by the user device 120 as a request for the recorded content 116. For example, a user or other entity may interact with a user interface that can be presented by the user device 120 to select a particular movie, show, or other content that has been recorded by the video device 102 as the recorded content 116. It should be understood that this example is illustrative, and therefore should not be construed as being limiting in any way.

In response to detecting selection of the movie, show, or other content, the user device 120 can generate a request for recorded content 116 that corresponds to the requested content and send the request (e.g., the recorded content request 122) to the video device 102. In response to receiving the recorded content request 122, the video device 102 can be configured to stream, transmit, or otherwise provide the recorded content 116 to the user device 120. Because the recorded content 116 can be requested in additional and/or alternative manners, and because the recorded content request 122 illustrated and described herein can be generated in response to additional and/or alternative actions, it should be understood that this example is illustrative, and therefore should not be construed as being limiting in any way.

From operation 302, the method 300 can proceed to operation 304. At operation 304, the video device 102 can identify the recorded content 116 and the manifest file 118 associated with the request received in operation 302. Thus, in operation 304, the video device 102 can identify a show, movie, or other video associated with the recorded content request 122 (or other request) received in operation 302. As explained above, the recorded content 116 and the manifest file 118 can be stored with data that associates the recorded content 116 and the manifest file 118 with one another and/or that identifies an associated title or other identifying information associated with the movie, show, and/or other video represented by the recorded content 116. Thus, in operation 304, the video device 102 can identify the recorded content 116 and the manifest file 118 requested in operation 302.

From operation 304, the method 300 can proceed to operation 306. At operation 306, the video device 102 can provide the manifest file 118 and the recorded content 116 to a requestor or recipient such as, for example, the user device 120. It can be appreciated that the user device 120 (and/or the playback application 124) can use the manifest file 118 to interpret and/or decode the recorded content 116, in some embodiments. Regardless, it can be appreciated that the user device 120 can use the manifest file 118 and the recorded content 116 to present the movie, show, episode, or other video. It should be understood that this example is illustrative, and therefore should not be construed as being limiting in any way.

From operation 306, the method 300 can proceed to operation 308. The method 300 can end at operation 308.

Figure 4:
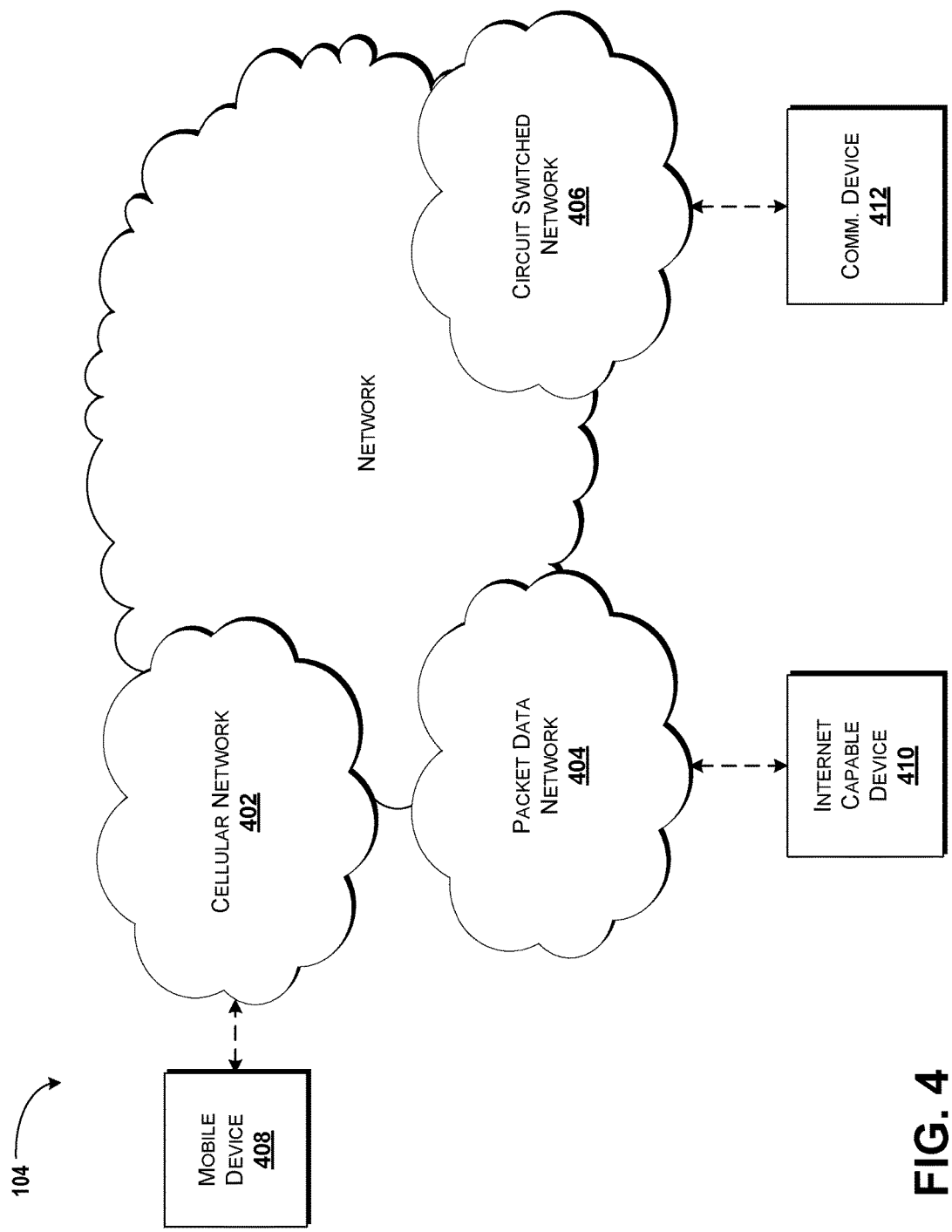
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
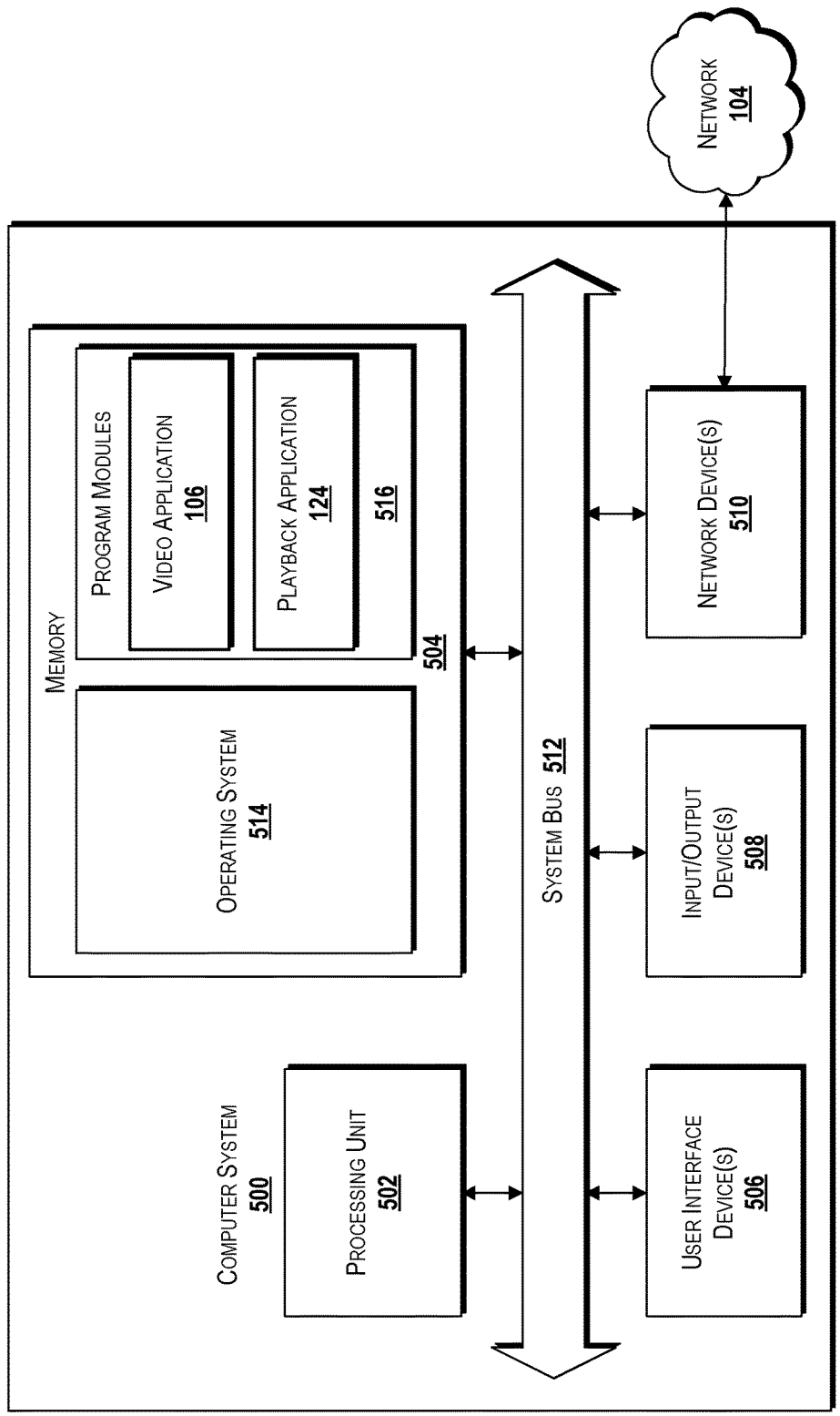
FIG. 5 is a block diagram illustrating an example computer system configured to create a manifest file at recording time, according to some illustrative embodiments of the concepts and technologies described herein.

FIG. 5 is a block diagram illustrating a computer system 500 configured to provide the functionality described herein for creating and/or using a manifest file 118 that is created at a time of creating recorded content 116, in accordance with various embodiments of the concepts and technologies disclosed herein. As such, it can be appreciated that the computer system 500 illustrated and described herein can correspond to an architecture for the video device 102 and/or the user device 120 illustrated and described herein. The computer system 500 also can correspond to an architecture for the server computer 110, in some embodiments. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or other families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the video application 106 and/or the playback application 124. These and/or other programs can be embodied in computer-readable media containing instructions that, when executed by the processing unit 502, perform one or more of the methods 200, 300 described in detail above with respect to FIGS. 2-3 and/or other functionality as illustrated and described herein. It can be appreciated that, at least by virtue of the instructions embodying the methods 200, 300 and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the media content 108, the media content request 114, the recorded content 116, the manifest file 118, the recorded content request 122, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
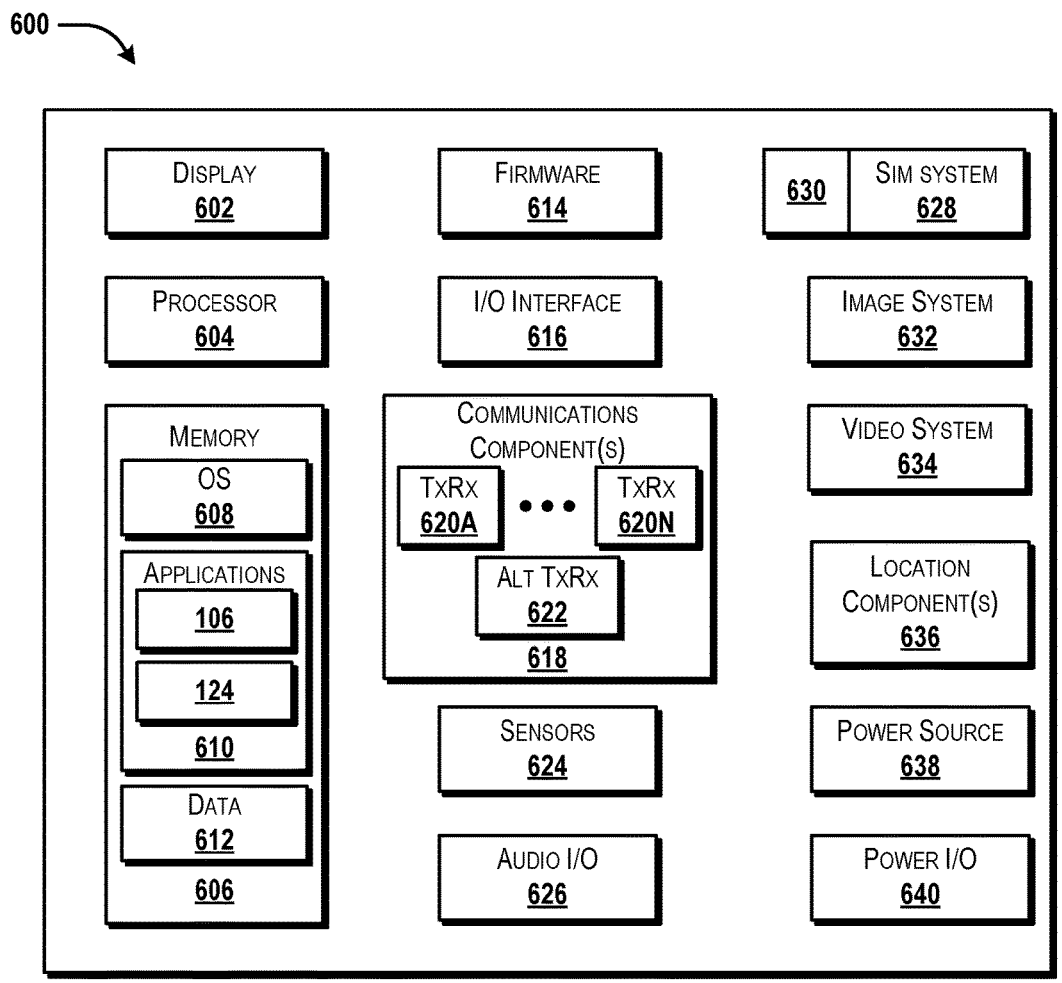
FIG. 6 is a block diagram illustrating an example mobile device configured to interact with a video device, according to some illustrative embodiments of the concepts and technologies described herein.

Turning now to FIG. 6, an illustrative mobile device 600 and components thereof will be described. In some embodiments, the user device 120 and/or the video device 102 described above with reference to FIGS. 1-5 can be configured as and/or can have an architecture similar or identical to the mobile device 600 described herein in FIG. 6. It should be understood, however, that the video device 102 and/or the user device 120 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements such as, for example, programming guides, recording interfaces, playback application interfaces, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the video application 106, the playback application 124, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, in requesting the media content 108, to requesting recorded content 116, to causing the video device 102 to record the media content 108 to create the recorded content 116 and/or the manifest file 118, configuring settings, multimode interactions, interacting with other applications 610, and otherwise facilitating user interaction with the operating system 608, the applications 610, and/or other types or instances of data 612 that can be stored at the mobile device 600. The data 612 can include, for example, the video application 106, the playback application 124, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604.

It can be appreciated that, at least by virtue of storage of the instructions corresponding to the applications 610 and/or other instructions embodying other functionality illustrated and described herein in the memory 606, and/or by virtue of the instructions corresponding to the applications 610 and/or other instructions embodying other functionality illustrated and described herein being accessed and/or executed by the processor 604, the mobile device 600 is a special-purpose mobile device that can facilitate providing the functionality illustrated and described herein. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, the media content 108, the media content request 114, the recorded content 116, the manifest file 118, the recorded content request 122, user information, organization information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 104 and/or the network connection(s) 126 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSDPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Based on the foregoing, it should be appreciated that systems and methods for creating a manifest file at a time at which recorded content is generated have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A video device comprising a customer premise equipment, the video device comprising:
   a processor; and
   a memory that stores computer-executable instructions that, when executed by the processor, cause the processor to perform operations comprising
      requesting, via a first network connection, media content from a content source,
      receiving, via the first network connection, the media content requested, wherein the media content is received from the content source,
      initiating recording of the media content to generate recorded content,
      initiating, during the recording of the media content, creation of a manifest file, whereby the manifest file and the recorded content are created while the media content is being received, and wherein the manifest file is stored before a request for the recorded content is received via a second network connection, and
      storing the recorded content and the manifest file.

2. The video device of claim 1, wherein the media content is requested in response to detecting a command to record the media content.

3. The video device of claim 1, wherein the media content is received with metadata from the content source, and wherein the manifest file comprises a portion of the metadata that is received from the content source.

4. The video device of claim 3, wherein the metadata comprises data that defines a segment associated with the media content, a frame rate of video associated with the media content, and information that defines an advertisement break associated with the video.

5. The video device of claim 1, wherein the computer-executable instructions, when executed by the processor, cause the processor to perform operations further comprising:
   receiving the request for the recorded content from a user device in communication with the video device via the second network connection;
   identifying the recorded content and the manifest file that was created during recording of the media content; and
   providing, to the user device via the second network connection, the recorded content and the manifest file that was created during recording of the media content.

6. The video device of claim 5, wherein providing the recorded content and the manifest file comprises:
   providing the manifest file to the user device, wherein the user device uses the manifest file to set up a video stream via the second network connection, wherein the recorded content is to be received via the video stream; and
   streaming the recorded content to the user device using the video stream.

7. A computer storage medium having computer-executable instructions stored thereon that, when executed by a processor, cause the processor to perform operations comprising:
   requesting, by a customer premise equipment comprising a video device and via a first network connection, media content from a content source;
   receiving, via the first network connection, the media content requested, wherein the media content is received from the content source;
   initiating recording the media content to generate recorded content;
   initiating, during the recording of the media content, creation of a manifest file, whereby the manifest file and the recorded content are created while the media content is being received, and wherein the manifest file is stored before a request for the recorded content is received via a second network connection; and
   storing the recorded content and the manifest file.

8. The computer storage medium of claim 7, wherein the media content is received with metadata from the content source, and wherein the manifest file comprises a portion of the metadata that is received from the content source.

9. The computer storage medium of claim 7, further comprising:
   capturing, during the recording of the media content, data that describes the media content, wherein the manifest file is created based on the data that describes the media content, and wherein the manifest file comprises a portion of the data.

10. The computer storage medium of claim 8, wherein the metadata comprises data that defines a segment associated with the media content, a frame rate of video associated with the media content, and information that defines an advertisement break associated with the video.

11. The computer storage medium of claim 7, wherein the computer-executable instructions, when executed by the processor, cause the processor to perform operations further comprising:
   receiving, via the second network connection, the request for the recorded content from a user device;
   identifying the recorded content and the manifest file that was created during recording of the media content; and
   providing, to the user device via the second network connection, the recorded content and the manifest file that was created during recording of the media content.

12. The computer storage medium of claim 11, wherein providing the recorded content and the manifest file comprises:
   providing the manifest file to the user device, wherein the user device uses the manifest file to set up a video stream via the second network connection, wherein the recorded content is to be received via the video stream; and
   streaming the recorded content to the user device using the video stream.

13. A method comprising:
   requesting, by a video device that comprises a processor and via a first network connection, media content from a content source;
   receiving, by the video device and via the first network connection, the media content requested, wherein the media content is received from the content source;
   initiating recording, by the video device, the media content to generate recorded content;
   initiating, by the video device and during the recording of the media content, creation of a manifest file, whereby the manifest file and the recorded content are created while the media content is being received, and wherein the manifest file is stored before a request for the recorded content is received via a second network connection; and
   storing, by the video device, the recorded content and the manifest file.

14. The method of claim 13, wherein the video device requests the media content in response to detecting a command to record the media content.

15. The method of claim 13, further comprising:
receiving, by the video device and via the second network connection, the request for the recorded content from a user device that communicates with the video device;
identifying, by the video device, the recorded content and the manifest file that was created during recording of the media content; and
providing, to the user device and via the second network connection, the recorded content and the manifest file that was created during recording of the media content.

16. The method of claim 13, wherein the media content is received with metadata from the content source, and wherein the manifest file comprises a portion of the metadata that is received from the content source.

17. The method of claim 16, wherein the metadata comprises data that defines a segment associated with the media content, a frame rate of video associated with the media content, and information that defines an advertisement break associated with the video.

18. The method of claim 13, further comprising:
capturing, during the recording of the media content, data that describes the media content, wherein the manifest file is created based on the data that describes the media content, and wherein the manifest file comprises a portion of the data.

19. The method of claim 15, wherein providing the recorded content and the manifest file comprises:
providing the manifest file to the user device, wherein the user device uses the manifest file to set up a video stream via the second network connection, wherein the recorded content is to be received via the video stream; and
streaming the recorded content to the user device using the video stream.

20. The method of claim 19, wherein the manifest file is stored as a hypertext transfer protocol live streaming file.

* * * * *